March 10, 1959 R. P. DUNMIRE 2,876,771
HYPODERMIC SYRINGES
Original Filed Sept. 28, 1951 2 Sheets-Sheet 1
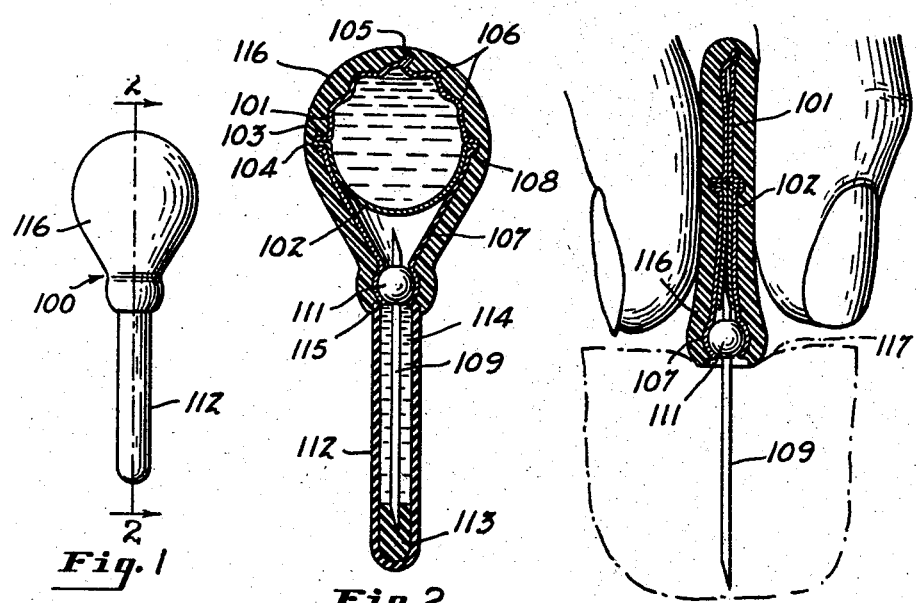
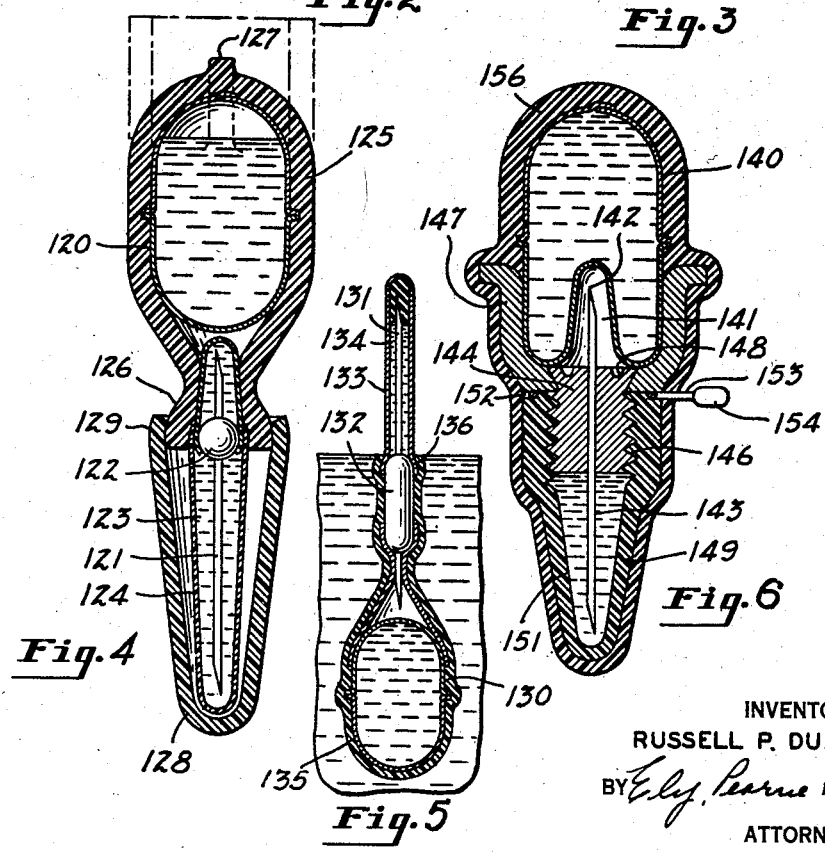
INVENTOR
RUSSELL P. DUNMIRE
BY Ely, Pearne & Gordon
ATTORNEYS

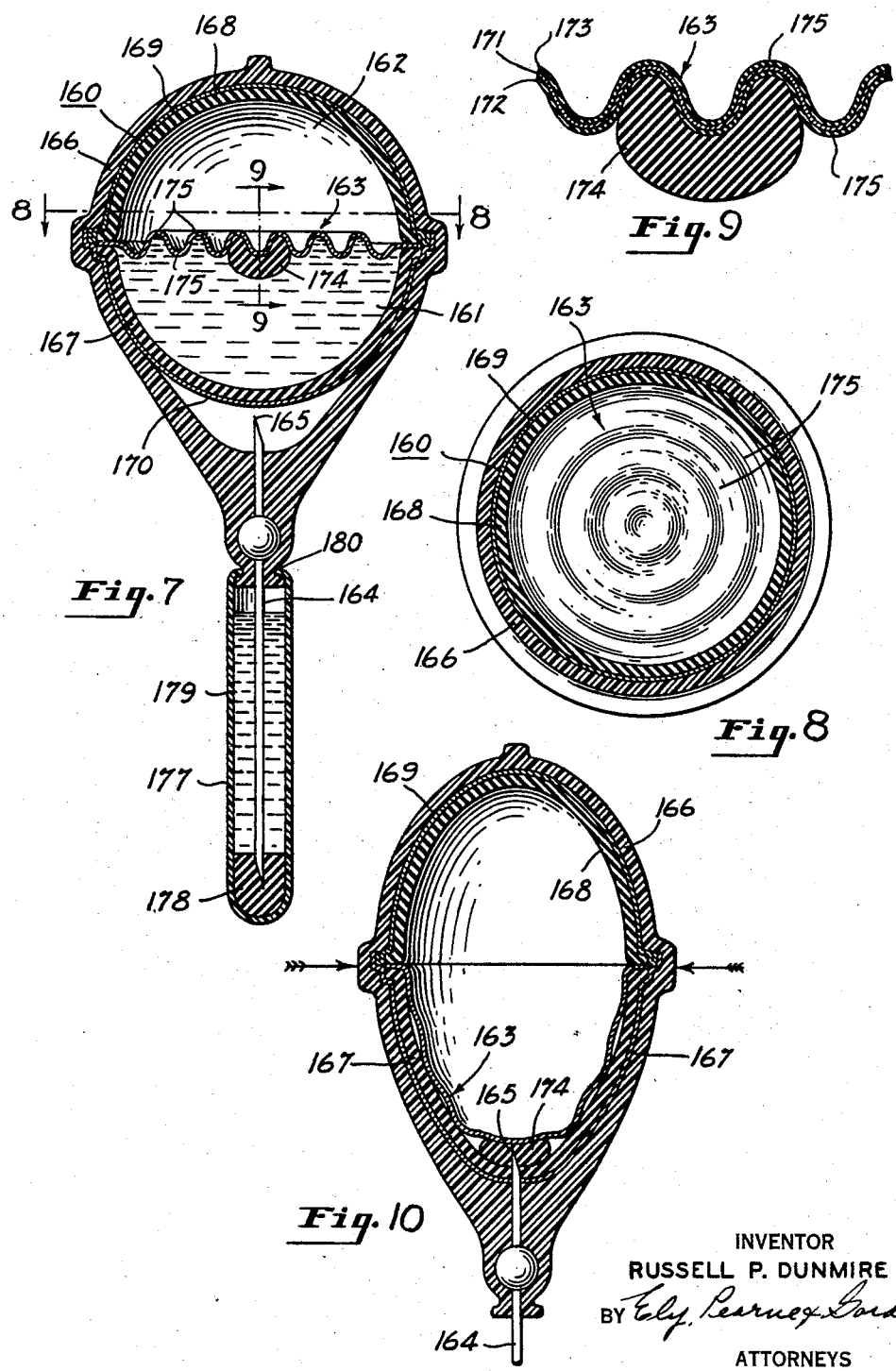

United States Patent Office 2,876,771
Patented Mar. 10, 1959

2,876,771

HYPODERMIC SYRINGES

Russell Paul Dunmire, Chagrin Falls, Ohio

Original application September 28, 1951, Serial No. 248,806, now Patent No. 2,696,212, dated December 7, 1954. Divided and this application November 30, 1954, Serial No. 472,192

12 Claims. (Cl. 128—216)

This invention relates to devices for injecting fluids through membranes and particularly to devices for effecting subcutaneous injections of medicaments and the like into human beings and animals. While especially valuable for injecting medicaments, the devices of the invention have characteristics rendering them useful for a wide variety of other types of injection operations in industry and scientific research.

This application is a division of my copending application Serial No. 248,806 filed September 28, 1951, for Hypodermic Syringe (U. S. Patent No. 2,696,212 of December 7, 1954).

The invention involves new injection devices and methods of making the same and, also, new techniques for effecting injections. Though in no way limited thereto, the invention principally relates to the provision of injection devices having the fluid to be injected sealed therein at the time manufacture of the devices is completed. Though it is contemplated that the devices will generally be discarded after being used to perform one injection, they may, of course, be saved for salvage of some or all of their component parts.

While it is always preferable that subcutaneous injections in human beings be prescribed by a qualified physician and be administered either by the physician or other trained and qualified person, there are many instances in which it is not practical to place such limitations on the subcutaneous administration of medicaments. For example, diabetics have commonly resorted to self-medication by subcutaneous injection of insulin, which many victims of this malady require at intervals too frequent for the normal precautions to be practical. Also, the prompt handling of epidemics, mass casualties in peacetime and wartime disasters, etc., occasionally demand more rapid administration of subcutaneous medicaments of one sort or another to human beings than can be accomplished alone by the trained and qualified personnel available.

Thus, there are numerous instances in which self-administration, or administration by relatively unskilled personnel, of injections to human beings is desirable or imperative. However, the requirements of proper cleansing and sterilization of the epidermis and of the injection apparatus, and careful measurement of the dose administered, render conventional hospital or laboratory apparatus and techniques awkward and cumbersome in the field. Accordingly, there is a great need for simpler equipment and techniques that are better adapted to meet such exigencies.

While many attempts have been made to satisfy this need, all of the devices proposed have had certain drawbacks or limitations that have greatly restricted their value and their versatility. The essential, or at least highly desirable characteristics include:

(1) Simple and inexpensive construction permitting mass production at a reasonable cost.

(2) Simple operation in use, permitting administration by persons having no special training or manual skill or dexterity.

(3) Resistance to the effects of thermal expansion and contraction.

(4) Resistance to great changes in atmospheric pressure.

(5) Availability in a sterile condition for prolonged periods of time without requiring resterilizing at the time of use.

(6) Zero M. V. T. R. (moisture and vapor transmission rate) through the wall of the enveloping package.

(7) Resistance to rough handling during transportation and use.

(8) Provision for sterilizing the epidermis in the region of the injection.

(9) Provision for protecting the punctured region of the epidermis from contact with infectious substances.

(10) Ability to preclude entrance of infectious substances during the injection.

(11) Operative in any position.

(12) Resistance (of the device itself) to corrosion, rot, attack by fungus, etc.

(13) Provision of means for positive later identification of the patient and of the character and amount of medication administered.

Insofar as I am aware, all of the devices heretofore proposed for administering medicaments subcutaneously have been seriously deficient in a number of these respects.

Briefly stated, the principal objects of the present invention are to provide injection devices in the nature of hypodermic syringes that more completely satisfy the above requirements than prior art devices, and to provide simple, economical, and efficient methods of making and using such syringes.

The foregoing and numerous additional objects, features, and advantages of the invention, and various illustrative constructions and techniques for making and using them will become apparent and more fully understood from the following detailed description of the invention, and from the accompanying drawings in which:

Fig. 1 is an elevational view, approximately actual size as printed in the patent, of a disposable hypodermic syringe embodying the invention;

Fig. 2 is a vertical or longitudinal section, on an enlarged scale, of the device of Fig. 1, the plane of the section being indicated by the line 2—2 of Fig. 1;

Fig. 3 is a view similar to Fig. 2, but showing the device just as a subcutaneous injection has been completed and before withdrawing the hypodermic needle from the patient, and illustrating how the medicament ampoule was manually collapsed during the injection;

Fig. 4 is a vertical sectional view similar to Fig. 2 but showing another modification of the invention;

Fig. 5 is a vertical sectional view of still another modification of the invention, the device being shown during the final step in its manufacture;

Fig. 6 is a vertical sectional view of still another modification of the invention;

Fig. 7 is a vertical sectional view of still another modification of the invention;

Fig. 8 is a sectional view of the device of Fig. 7, the plane of the section being indicated by the line 8—8 of Fig. 7;

Fig. 9 is a fragmentary sectional view of the device of Fig. 7, the plane of the section being indicated by the line 9—9 in Fig. 7; and Fig. 10 is a fragmentary view similar to Fig. 7 but showing the device partially collapsed in use.

Figs. 1–3 show one form of the invention and illustrate its operation in use. As best shown in Fig. 2, the syringe, generally designated 100, comprises a generally spherical ampoule that may be conveniently formed from a pair of flanged, generally hemispherical shells 101 and 102 of thin aluminum or the like. The shells may be joined where their flanges 103 and 104 meet by cold welding the flanges together with the shells submerged in the injection fluid to form and fill the ampoule simultaneously. Alternatively, one of the shells 101 may be formed in the shape of an inverted funnel to provide a small-neck opening for filling the ampoule after the two shells have been joined together, whereupon the small neck of the opening may be pinched closed and sealed, as shown at 105, by cold welding. To permit expansion of the ampoule when subjected to internal expansive forces of the type mentioned above, one or both of the shells may be formed with corrugations therein, as shown at 106.

Simultaneously with the joining of the two shells 101 and 102, or thereafter, a generally funnel-shaped shell 107, preferably made of the same thin metal as the shells 101 and 102 and having a flange 108 about its large upper end, may be joined to the ampoule, as shown, by cold welding the flange 108 of the member 107 to the flange 104 of the shell 102.

A hypodermic needle 109, pointed at each end, is provided with an enlargement 111 formed thereon adjacent one end thereof; and the small end of the funnel-shaped member 107 is slipped over this enlargement, is deformed to fit snugly about the enlargement, and is cold welded, cemented, soldered, or otherwise secured and sealed thereto to form a tight and leak-proof joint. In this manner, the needle and ampoule may be temporarily held in the relationship illustrated in Fig. 2.

A deeply cupped container 112, preferably formed of a relatively rigid, heat sealable, plastic material, is provided with a plug 113 of soft rubber or the like forced into the container to the bottom thereof with a tight enough fit to resist removal. Alternatively, the plug 113 may be formed integrally with the cup 112 or heat sealed thereto. The cup 112 is filled, or substantially filled, with a suitable sterlizing liquid 114, preferably containing a suitable dye, and then the long, exposed portion of the needle 109 is inserted into the cup 112 until the point thereof is embedded well into the plug and the rim of the cup is seated snugly against the enlargement 111 of the needle, or against the lower end of the funnel-shaped member 107 enveloping the needle enlargement 111.

As a final step in the production of the filled syringe, an outer envelope 116 of flexible plastic material is molded or otherwise formed around the ampoule and the funnel-shaped member 107 and is heat sealed at 115 around the rim of the cup 112 to prevent leakage from the cup and to provide a continuous plastic layer enclosing the ampoule for additional protection of the injection fluid from leakage and contamination from exterior influences.

When employing this form of the invention, it is first grasped about the enlargement 111, and the cup 112 is twisted to break the seal 115 at its upper end and permit its removal. The sterilizing liquid 114 is poured from the cup over the epidermis 117 where the injection is to be made to provide the desired antiseptic and sterile condition of the epidermis. While grasping the syringe about the enlargement 111 between the thumb and forefinger, the needle is inserted through the epidermis in a conventional manner. Thereupon, the ampoule is squeezed from opposite sides between the thumb and forefinger. This first distorts the ampoule toward the adjacent pointed end of the needle, punctures the shell 102 and releases the injection fluid. Then, as the ampoule is completely collapsed to the condition shown in Fig. 3, the injection fluid is forced through the needle and into the patient. The needle may then be withdrawn and the syringe discarded or saved for salvage.

Fig. 4 shows a variation of the same general construction as the one shown in Figs. 1-3. In this embodiment of the invention, the ampoule 120 is elongated longitudinally of the syringe but is otherwise generally similar in construction to the ampoule in Figs. 1-3. A similar needle 121, having an enlargement 122, is completely surrounded by a sterilizing liquid 123 enclosed within a thin envelope 124 of a suitable plastic film, shown as made of upper and lower portions overlapped and joined together around the enlargement 122. A premolded shell 125 of rubber or heat sealable plastic material is shaped at one end 126 to fit snugly around one end of the plastic envelope 124 and the enlargement 122 of the needle with the opposite end of the shell completely open as indicated in phantom outline. The small end 126 of the shell 125 may be expanded in a well-known manner to permit the needle 121 and envelope 124 to be inserted without rupturing the envelope. The ampoule 120 is then inserted through the open end of the shell 125, whereupon the open end of the shell is closed and sealed along a seam 127, preferably by employing a self trimming mold. Finally, a protective shell 128, preferably formed of relatively rigid, heat sealable, plastic material, is slipped over the exposed portion of the envelope 124, and the open end 129 of the shell 128 is deformed under heat and moderate pressure to fit it snugly around the adjacent end 126 of the shell 125 and seal it thereto.

When employing this form of the invention, the shell 128 is first twisted off. The needle is then inserted by forcing it through the lower end of the envelope 124 and into the epidermis in one motion, permitting the sterilizing fluid 123 to flow over and around the area of the epidermis in which the needle is inserted. Upon squeezing the ampoule 120 from opposite sides, the ampoule 120 is first deformed longitudinally toward the adjacent pointed end of the needle 121, forcing the needle to penetrate the upper end of the envelope 124 and the wall of the ampoule and release the injection fluid. Complete collapsing of the ampoule in the same manner as shown in Fig. 3 then forces the injection fluid through the needle and into the patient.

Fig. 5 shows a syringe generally similar to that illustrated in Figs. 1-3, but including an elongated metallic ampoule 130 and a modified needle 131. In this case the enlarged portion 132 of the needle is also elongated to provide greater length in that region for grasping and manipulating the device. In other respects, this form of the invention is constructed in substantially the same manner as the device of Figs. 1-3 up to the time the cup 133 is applied. In this case, the cup 133 is shown as made of metal. The open end of the cup 133, while the cup is filled with an antiseptic fluid or ointment 134 and held in an upright position, is fitted around the enlargement 132 of the needle and sealed thereto with the aid of a cement (not shown) disposed therebetween. The device is then inverted, and a final coating 135 around the ampoule 130, around the adjacent end of the needle 131, and around the sealed end 136 of the cup 133 is applied by dipping the device as shown.

The device of Fig. 5 is used in the same manner as the device of Figs. 1-3.

Fig. 6 shows another syringe that is constructed along the same general lines as the syringes of Figs. 1-5 but includes a number of variations in its construction details. In this device an ampoule 140 of thin aluminum or the like is constructed similarly to the ampoule of Fig. 4, except that the lower half of the ampoule shell is deformed upwardly at its center to provide an inverted cup-shaped well or indentation 141 receiving and surrounding the adjacent pointed end 142 of a needle 143. The needle 143 is surrounded between its ends by a relatively heavy collar 144 that is externally threaded at 146 over the major portion of its length. The end of the collar toward the pointed end 142 of the needle is seated and secured in an aperture in the bottom of a cup-shaped yoke 147, this end of the collar 144 being swaged at 148 to expand it and anchor it rigidly in the yoke 147. A protecting shell 149, that may be made of a relatively rigid plastic material or metal, as desired, is internally threaded at its upper end and is filled with an antiseptic fluid 151 and screwed onto the threaded portion 146 of the collar 144. The upper end of the protecting shell 149 is formed with a shallow annular notch 152 around the rim thereof to receive a string 153 that is looped entirely around the upper end of the shell with one end of the string, having a knot or ball 154 thereon, extending freely outwardly to be grasped with the fingers. The entire device may then be dipped or otherwise coated with a suitable outer plastic coating 156.

This form of the invention is used by first grasping the knot or ball 154 on the free end of the string 153 and pulling it to break the plastic coating 156 entirely around the joint between the protecting shell 149 and the yoke 147. The shell 149 is then unscrewed and the antiseptic contents 151 thereof poured on the epidermis where the injection is to be made. While grasping the syringe about the yoke 147, the needle is inserted into the patient and the ampoule 140 is collapsed by pressing the thumb downwardly on the top thereof. This first forces the portion of the metallic ampoule shell opposite the pointed butt end 142 of the needle against the point thereof, thus puncturing the ampoule and permitting the injection fluid to flow through the needle and into the patient as the collapsing of the ampoule is completed by continuing the downward pressure thereon.

Still another variant of the invention is illustrated in Figs. 7–10 in which use is made of a gas under pressure to assist in forcing an injection fluid from the syringe without permitting any of the gas to be discharged through the needle.

In this embodiment of the invention, a two compartment ampoule, generally designated 160, is formed and preferably first charged with the injection fluid confined in one compartment 161 and separated from a gas compartment 162 by an expandable, gas-impervious diaphragm 163. Then the gas compartment 162 is filled with any desired gas under pressure, whereupon the ampoule and a needle 164 may be assembled in a premolded, rubber or plastic, outer shell 166 in the same manner as the syringe of Fig. 4.

A preferred ampoule construction for a device of this character comprises a pair of flanged, hemispherical shells 167 and 168 that may be brought together with the periphery of the diaphragm 163 sandwiched therebetween, and the two shells and the diaphragm may then be firmly joined and sealed together by heat and pressure. If desired, at this point, the injection fluid may be injected into the compartment 161 therefor, and then the gas under pressure may be injected into or generated in the other compartment 162. Injections of fluid or gas into the compartments may be made by passing hypodermic needles through the shells 167 and 168 while exhausting air from the compartments through other needles inserted in the same manner. The butyl rubber, being self-sealing when the needle is withdrawn, will retain the injection fluid and gas after withdrawal of the needles, as is well-known. Thereupon, a pair of protective, hemispherical shells 169 and 170 of thin sheet aluminum may be disposed around the filled butyl rubber ampoule and sealed by cold welding along a circumferential seam.

Alternatively, the ampoule may be enclosed with an aluminum shell before being filled, with suitable apertures (not shown) formed in the aluminum shell to receive the filling needles and air exhausting needles. Such openings in the aluminum shell may have peripheral flanges adapted to be folded together and cold welded after the ampoule has been charged with injection fluid and gas, in the same manner as the shell 101 may be sealed at 105 in Fig. 2.

The diaphragm 163, diagrammatically shown as being of thin sheet metal in Figs. 7 and 10, is preferably a laminated sheet composed of three layers of material, as illustrated in cross-section on a larger scale in Fig. 9. The central layer 171 may be of thin sheet aluminum and the top and bottom layers 172 and 173 may be made of the same butyl rubber or the like as the shells 167 and 168. In addition, a protecting pad 174, preferably made of a relatively harder rubber less easily penetrated by the pointed butt end 165 of the needle 164, is adhered to the center of the diaphragm 163 on the bottom side thereof for the purpose hereinafter described. This laminated material is formed with a number of concentric, annular corrugations 175 to permit expansion as hereinafter described.

The filled and completed ampoule 160 and the needle 164 may then be assembled in the outer plastic or rubber shell 166. Finally, a rigid, deeply cupped shell 177, preferably made of a hard plastic and containing a soft plug 178 in the bottom thereof, is filled with an antiseptic fluid 179. The shell 178 is snapped into place and heat sealed around its neck 180 to the outer ampoule cover 166.

The syringe of Figs. 7–10 is used similarly to those of Figs. 1–5, except that the ampoule need be only partially collapsed by lateral pressure as indicated by arrows in Fig. 10. The slight collapsing shown in Fig. 10 deforms the portion of the ampoule shell forming the fluid compartment 161 toward the pointed butt end 165 of the needle until the needle punctures this shell. This releases the fluid for flow through the needle 164 and permits the gas in the compartment 162 to expand the corrugated diaphragm 163 until it conforms generally to the contour of the wall of the injection fluid compartment 161, thus automatically forcing substantially all of the injection fluid out through the needle 164.

When the diaphragm 163 has expanded to the fullest extent required, it may touch the pointed butt end 165 of the needle 164. To guard against the possibility of the diaphragm 163 being completely punctured in such a case, which would also release the gas for flow through the needle 164, the pad 174 is provided as described above. By making the pad 174 of sufficiently hard rubber or other material of sufficient thickness, it can be made to resist complete penetration of the diaphragm by limting expansion of the diaphragm against the point 165, as shown in Fig. 10.

This last embodiment of the invention, though it employs a gas under pressure to exhaust the injection fluid from the ampoule, is otherwise very similar in construction to the devices of Figs. 1–6, and is obviously susceptible to many of the same structural variations. It possesses great advantages over prior gas actuated devices in that it may be disposed at any angle in use with equal effectiveness and never injects any of the working gas or frangible glass particles into the patient.

From the foregoing description of the structure, method of manufacture and use of a variety of forms of injection devices, it will be appreciated that the basic principles of the invention common to the various devices are applicable in many different ways to the injection of fluids of all kinds through penetrable walls or membranes. The invention is not intended to be limited to the particular structural details and methods of manufacture selectively disclosed herein to illustrate presently preferred forms of the invention, but is intended to include the many variations thereof within the scope of the appended claims that will occur to those skilled in the art.

Having disclosed my invention, I claim:

1. A hypodermic syringe comprising a closed fluid ampoule of flexible material, a hypodermic needle, and a shell of flexible material surrounding said fluid ampoule and the butt end portion of said needle, the butt end of said needle terminating in a point directed toward said fluid ampoule in close proximity thereto.

2. A hypodermic syringe comprising a closed ampoule of flexible material containing an injection fluid, a hypodermic needle, and a shell of flexible material surrounding said fluid ampoule and the butt end portion of said needle, the butt end of said needle terminating in a point directed toward said fluid ampoule in close juxtaposition therewith, and a cap enclosing the remainder of said needle and removably secured to said shell in sealed relation therewith, said cap also containing a flowable sterilizing material.

3. A hypodermic syringe comprising a closed fluid ampoule of flexible material, a hypodermic needle, and a shell of flexible material surrounding said fluid ampoule and the butt end portion of said needle, the butt end of said needle terminating in a point directed toward said fluid ampoule in close juxtaposition therewith, said ampoule having a flexible and expandable, gas impervious diaphragm extending generally transversely with respect to the pointed butt end of said needle and dividing the interior of said fluid ampoule into a chamber for an injection fluid on one side of said diaphragm adjacent the butt end of said needle and a chamber for gas under pressure on the opposite side of said diaphragm.

4. A hypodermic syringe comprising a closed fluid ampoule of flexible material, a hypodermic needle, and a shell of flexible material surrounding said fluid ampoule and the butt end portion of said needle, the butt end of said needle terminating in a point directed toward said fluid ampoule in close juxtaposition therewith, said fluid ampoule having a flexible and expandable, gas impervious diaphragm extending generally transversely with respect to the pointed butt end of said needle and dividing the interior of said fluid envelope into a chamber for an injection fluid on one side of said diaphragm adjacent the butt end of said needle and a chamber for gas under pressure on the opposite side of said diaphragm, and a cap enclosing the remainder of said needle and removably secured to said shell in sealed relation therewith.

5. An injection device comprising a flexible, non-frangible ampoule containing an injection fluid, a hollow injection needle for receiving fluid from said ampoule through one end thereof, a liquid retaining, collapsible, non-frangible shell surrounding said ampoule and said end of said needle and sealed around the needle to form a separate compartment communicating with said needle as its only outlet passageway, whereby rupture of said ampoule by partially collapsing said shell will permit the injection fluid to flow therefrom into said compartment for discharge through said needle.

6. An injection device according to claim 5 in which said one end of said needle is pointed and is directed toward a wall of said ampoule in close proximity thereto for puncturing the same when said ampoule and said shell about said ampoule are partially collapsed.

7. A hypodermic syringe comprising a body of flexible material defining a closed, collapsible, fluid ampoule, a hypodermic needle having a pointed butt end directed toward a wall portion of said fluid ampoule in close proximity thereto and having a pointed discharge end directed away from said fluid ampoule, said wall portion of the fluid ampoule being sufficiently thin and flexible to be distorted against the butt end of the needle and punctured upon the application of external pressure to the ampoule for collapsing the same, and said body of flexible material also surrounding and gripping said needle between its ends and enclosing the pointed butt end portion thereof in a closed compartment adjacent said ampoule.

8. A hypodermic syringe according to claim 7, including a cap disposed over the discharge end portion of the needle and sealed to said flexible body to enclose the remainder of the needle in another closed compartment.

9. A hypodermic syringe according to claim 7, including a cap disposed over the discharge end portion of the needle and sealed to said flexible body to enclose the remainder of the needle in another closed compartment, said cap also containing a flowable sterilizing material.

10. A hypodermic syringe comprising a hypodermic needle having a pointed discharge end and a pointed butt end, a body of flexible material defining a closed, collapsible, fluid ampoule and an adjacent closed compartment separated by a common wall therebetween, the pointed butt end of the needle projecting into said compartment through an outer wall thereof in sealed relationship therewith and being directed toward and in close proximity to said common wall for puncturing the same when said fluid ampoule is partially collapsed.

11. A hypodermic syringe according to claim 10, including a cap disposed over the discharge end portion of the needle and sealed to said flexible body to enclose the remainder of the needle in another closed compartment.

12. A hypodermic syringe according to claim 10, including a cap disposed over the discharge end portion of the needle and sealed to said flexible body to enclose the remainder of the needle in another closed compartment, said cap also containing a flowable sterilizing material.

References Cited in the file of this patent

UNITED STATES PATENTS

| 913,297 | Krautschneider | Feb. 23, 1909 |
| 921,130 | Lockwood | May 11, 1909 |
| 974,531 | Schwarz et al. | Nov. 1, 1910 |
| 1,455,047 | Goold | May 15, 1923 |
| 1,668,588 | Greeley | May 8, 1928 |
| 1,860,898 | Meyer | May 31, 1932 |
| 2,403,074 | Goldsmith | July 2, 1946 |
| 2,666,434 | Ogle | Jan. 19, 1954 |
| 2,676,591 | Fox | Apr. 27, 1954 |

FOREIGN PATENTS

| 84,899 | Germany | Jan. 22, 1896 |